US007304942B1

(12) United States Patent
Malladi et al.

(10) Patent No.: US 7,304,942 B1
(45) Date of Patent: Dec. 4, 2007

(54) METHODS AND APPARATUS FOR MAINTAINING STATISTIC COUNTERS AND UPDATING A SECONDARY COUNTER STORAGE VIA A QUEUE FOR REDUCING OR ELIMINATING OVERFLOW OF THE COUNTERS

(75) Inventors: Srinivasa Rao Malladi, San Jose, CA (US); Earl T. Cohen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1177 days.

(21) Appl. No.: 10/295,181

(22) Filed: Nov. 15, 2002

(51) Int. Cl.
*H04J 1/16* (2006.01)

(52) U.S. Cl. .................. 370/229; 370/363; 370/428

(58) Field of Classification Search .................. None
See application file for complete search history.

(56) References Cited

U.S. PATENT DOCUMENTS

| | | | |
|---|---|---|---|
| 4,733,390 A | | 3/1988 | Shirakawa et al. |
| 5,289,517 A | * | 2/1994 | Ohba et al. .................. 377/44 |
| 5,463,620 A | | 10/1995 | Sriram |
| 5,953,338 A | | 9/1999 | Ma et al. |
| 6,067,301 A | | 5/2000 | Aatresh |
| 6,144,662 A | * | 11/2000 | Colmant et al. ............ 370/390 |
| 6,154,829 A | * | 11/2000 | Mino et al. .................. 712/35 |
| 6,625,266 B1 | * | 9/2003 | Saari et al. ............ 379/112.01 |
| 6,678,248 B1 | | 1/2004 | Haddock et al. |
| 6,856,257 B1 | | 2/2005 | Van Heteren |
| 2001/0033581 A1 | * | 10/2001 | Kawarai et al. ............ 370/468 |
| 2002/0180540 A1 | * | 12/2002 | Hirai .......................... 331/100 |

OTHER PUBLICATIONS

Shah et al., "Maintaining Statistics Counters in Router Line Cards," IEEE Micro, Jan.-Feb. 2002, pp. 76-81.

* cited by examiner

*Primary Examiner*—Chi Pham
*Assistant Examiner*—Phuc Tran
(74) *Attorney, Agent, or Firm*—The Law Office of Kirk D. Williams (57) ABSTRACT

Methods and apparatus are disclosed for maintaining statistic counters and updating a secondary counter memory via a queue for reducing or eliminating overflow of the counters. Multiple counter values are stored in a primary counter storage. An indication of a particular counter to update is received. An updated value for the particular counter is determined. A determination is made whether to store the updated value in the primary storage or to add to an update counter queue based on the updated value and an occupancy level of the update counter queue. In one implementation, this determination includes comparing a function of the updated value with the occupancy level. In one implementation, this determination includes comparing twice the updated value with the occupancy level. In one implementation, a backpressure signal is generated if the updated value is to be added to the update counter queue and the queue is full.

23 Claims, 6 Drawing Sheets

METHODS AND APPARATUS FOR MAINTAINING STATISTIC COUNTERS AND UPDATING A SECONDARY COUNTER STORAGE VIA A QUEUE FOR REDUCING OR ELIMINATING OVERFLOW OF THE COUNTERS

FIELD OF THE INVENTION

This invention especially relates to communications and computer systems; and more particularly, the invention relates to methods and apparatus for maintaining statistic counters, such as in, but not limited to a packet switching system, and updating a secondary counter storage via a queue for reducing or eliminating overflow of the counters.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

In networking devices, it is important to maintain accurate packet and byte count statistics for all traffic flowing through the device. Such statistics are important for customers, for lab testing, and also for verification and debug. Generally, statistics must be maintained for a large number of items in a few different categories (e.g., individual routes the packets are taking, the adjacencies (next hops) of the packets, etc.). It is not unusual for a core router to need to maintain statistics on packets arriving at a rate of 50M packets per second (PPS), and to have to support 1M routes (1M different sets of packet and byte counters in the route category).

Maintaining accurate statistics is so important that many systems will "back-pressure" (artificially restrict the rate of incoming traffic) rather than lose any counter updates in the event that they cannot keep up with the counter-update rate. A very big issue in maintaining these counters is providing the necessary combination of storage space and bandwidth in a fashion that is cost effective, low in power, and low in pin count. Complicating the bandwidth issue is that, as the number of counters grows, the frequency at which S/W can read an individual counter lessens. To prevent counter overflow, the counters must be made large enough so that they will not overflow in the time it takes software to service (read) all the counters. In a system with 1M counters, it is not unreasonable for S/W to read all the counters every 10 sec. This implies that the size of the counters must be chosen so that they do not overflow in at least 10 sec. Reasonable counter sizes for a 50M PPS arrival rate are at least 32 bits for packet counters, and at least 38 bits for byte counters. The size and number of counters make storing the full counters directly on a packet-switching chip impractical with today's technologies.

There is an additional advantage to storing the counters in a large off-chip memory—if the counters can be made sufficiently large (e.g., approximately 56 bits), then they will overflow so infrequently (tens of years) that S/W does not have to periodically read them to prevent overflow. Large enough counters will only have to be read when it is desired to gather the statistics from them.

At a peak rate of 50M counter updates per second (cups), and using 128 bits to store both the byte and packet counters for one item, the bandwidth required for counter updates (which must read the old counter value and then write back an updated value) is approximately 12.8 Gbps (and this ignores overheads due to CPU access to the counters and to refresh cycles for DRAM based solutions). This data bandwidth could be achieved by a 64-bit wide Reduced Latency Dynamic Random Access Memory (RLDRAM) at 200 MHz, with appropriate attention to pipelining and bank conflicts. But this would only support one category of counter, and typical implementations have two or three categories they try to maintain. As can be seen, the cost (in terms of board space, power budget, and dollars) of implementing this large a number of counters off-chip at the necessary throughput rate can be very high.

The large number of packet and byte counters required necessitates some type of RAM-based storage for the counters. Updating a RAM-based counter, however, involves doing a read-modify-write (RMW) open—the previous contents of the RAM must be read, the contents must be updated, and the new contents must be written back. An RMW open is well-known in the art, but it does require more bandwidth since the RAM must be accessed twice for each counter update.

Previous solutions to the counter update problem have used very expensive, high-bandwidth off-chip RAM-based solutions (high-speed DDR or QDR SRAMs or DDR SDRAM) that can keep up with the worst-case counter-update bandwidth requirements. If the packet arrival rate is 50M PPS, then the counter-update rate (for one type of counter) is 50M counter updates per second (cups) in the worst case. And on top of this, some bandwidth is necessary for CPU activity (to read the counters), and for refresh (for DRAM-based solutions).

Some solutions to this problem have used FIFOs to compensate for reduced bandwidth and/or CPU activity (which can delay counter updates). These solutions have generally just used the FIFO as a buffer—the off-chip RAM is still designed for the worst-case bandwidth. (Typically, such FIFOs can hold no more than a few thousand entries, much smaller than the number of items.)

Another technique that has been used is to build two-level counters, where the least-significant bits (LSBs) and the most-significant bits (MSBs) are maintained separately. This can save bandwidth by only having to reference the MSBs when the LSBs overflow, instead of on every counter update.

Some aspects of the counter update problem are described in the article: Devavrat Shah et al., *Maintaining Statistics Counters in Router Line Cards*, IEEE Micro, Jan.-February 2002, pp. 76-81, which is hereby incorporated by reference. Shah et al. describe a theoretical approach, and a largest-counter-first counter management algorithm (LCF CMA) that selects a counter with the largest count to update to a secondary memory. This requires that some mechanism be employed to maintain counters in a sorted order or to quickly determine the largest counter. Shah et al. admit that their "LCF CMA is a complex algorithm that is hard to implement at a very high speed. It would be interesting to obtain a similar performance as LCF CMA with a less complex algorithm." *Id.* at 80-81.

SUMMARY OF THE INVENTION

Methods and apparatus are disclosed for maintaining statistic counters and updating a secondary counter memory via a queue for reducing or eliminating overflow of the counters. One embodiment stores multiple counter values in a primary counter storage. An indication of a particular counter to update is received. A current value of the particular counter is identified. An updated value for the particular counter is determined based on the current value. A determination is made whether to store the updated value in the primary storage or to add to an update counter queue based on the updated or current value and an occupancy level of the update counter queue. In one embodiment, this determination includes comparing a function of the updated value with the occupancy level. In one embodiment, this determination includes comparing twice the updated value with the occupancy level. In one embodiment, a backpressure signal is generated if the updated value is to be added to the update counter queue and the queue is full.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for maintaining counters and updating a secondary counter storage via a queue for reducing or eliminating overflow of the counters, such as that which may be created when communicating information between nodes of a network, between components in a computer or communications system, or between any two devices or other mechanisms. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configuns within the scope and spirit of the invention, with the figures illustrating exemplary and non-limiting configuns.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing opens on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the open is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for maintaining statistic counters and updating a secondary counter memory via a queue for reducing or eliminating overflow of the counters. One embodiment stores multiple counter values in a primary counter storage. An indication of a particular counter to update is received. An updated value for the particular counter is determined. A determination is made whether to store the updated value in the primary storage or to add to an update counter queue based on the updated value and an occupancy level of the update counter queue. In one embodiment, this determination includes comparing a function of the updated value with the occupancy level. In one embodiment, this determination includes comparing twice the updated value with the occupancy level. In one embodiment, a backpressure signal is generated if the updated value is to be added to the update counter queue and the queue is full.

Any function of the updated value could be used in comparison with the occupancy level. For example, in one embodiment, a simple linear function is used to scale the updated value, such as multiplying the updated value by a weighted value and comparing it with the occupancy level. This weighted value could be any number (e.g., an integer, nal number, real number, etc). For example, one embodiment with a 5-bit packet counter uses a weighted value of two (resulting in comparing twice the updated value with the occupancy level). While one embodiment using a 12-bit byte counter uses a weighted value of $1/64$ (resulting in comparing $1/64$ of the updated value with the occupancy level). Although not required, these illustrative choices of packet counter and byte counter weighted values result in scaling these two varying-sized values to the same range (e.g., 0-63).

The function used may be also non-linear. For example, one embodiment compares $2^{\wedge}(\text{weighted value}*\text{updated value})$ with the occupancy level, which results result in larger updated values having more chances to enter the update counter queue.

In one embodiment, the function is one of three values, returning a flush indication: 1 to flush the counter to the updated counter queue, or 0 to update the counter in the primary counter storage. The three values input to the function are the current value of the counter (current_value), the counter update value (increment_amount), and the occupancy level of the FIFO (occupancy_level): flush (current_value, increment_amount, occupancy_level) For example, the function for the simple linear case previously described ("comparing twice the updated value with the occupancy level") would be: 2*(current_value+increment_amount)>=occupancy_level.

In one embodiment, as packets arrive, the least-significant bits of the required packet and byte count statistics are maintained in an on-chip RAM (such as EDRAM). This RAM typically is as deep as the number of items (e.g., the number of routes), and may be sized to be only as wide as required to reduce the overflow rate to a suitable amount. Off-chip memory (e.g., RLDRAM) is used to maintain the larger, full-sized counters. A read-modify-write (RMW) mechanism is used to read the counters, update the value, and write back the new value to the on-chip RAM.

In one embodiment, an overflow FIFO is used to hold the counters that have incremented to the point where they should be written to the off-chip memory. When it is determined that the off-chip representation of a counter should be updated, an identifier of the counter and its current value are put in the FIFO and subsequently updated in off-chip memory (using an RMW operation). This operation "flushes" the on-chip packet and byte statistics so that they will be zero after they are committed to the overflow FIFO.

In one embodiment, whenever an on-chip counter is incremented, it becomes a candidate for flushing (e.g., sending its updated value to off-chip memory, and resetting its current value). Any on-chip counter can be flushed as soon as it is non-zero, which maximizes the number of chances to flush prior to overflow. If the on-chip counters were always flushed whenever they were incremented, the overflow FIFO would rapidly fill up and back-pressure would be necessary. Thus, one embodiment controls the admittance to the overflow FIFO in a way that lets counters get flushed before their overflow is critical. There is a trade-off that can be made between the on-chip storage and the off-chip bandwidth. If wider, on-chip counters can be used for the least-significant bits, the counters will have many more chances to be flushed before they overflow. This can reduce both the overflow FIFO size, and the amount of off-chip bandwidth required.

Depending on the embodiment, the determination whether or not to flush a counter is made after, during or before incrementing the counter. Typically, if the value has overflowed or is within a margin such that it will overflow next update, then if the FIFO is full, backpressure is exerted until the FIFO is no longer full and the counter is added to the FIFO and its on-chip value set to zero, else the counter is immediately added to the FIFO and its on-chip value set to zero.

In one embodiment, the determination whether or not to flush a counter includes whether n times the new counter value is greater than the number of updates currently residing in the FIFO; and if so, the counter is flushed. In one embodiment the value of n is two. In one embodiment the value of n is any real number. This lets any overflowed counter enter the FIFO (if there is any space at all), and lets smaller-valued counters enter as long as they are more critical (larger) than the work already queued in the FIFO.

In one embodiment, the rate at which counters are updated exceeds the rate at which counter values can be removed from the FIFO. Thus, there must be some mechanism to throttle the rate at which counters are added to the FIFO. The determination on what conditions to flush a counter value can vary between embodiments. Moreover, one embodiment only considers flushing counters that have been updated as this reduces the pool of counters to consider, as well as processes only those counters that have the potential for overflowing during that update.

The use of the FIFO also handles bursts of flushed counters, such as when multiple counters are flushed within a short time duration. Thus, one embodiment sizes the FIFO to accommodate these bursts, and uses a determination mechanism (e.g., overflow detection mechanism) to throttle the rate at which counters are flush such that the likelihood of the FIFO becoming full is eliminated or decreased.

One embodiment allows a k-bit on-chip counters to have $2^k-1$ chances to be flushed before it overflows. The odds of a counter being flushed (on any one reference) are roughly the ratio between the FIFO drain rate (off-chip counter update rate) and the FIFO arrival rate. Assuming a burst of counters with the same value—larger, more critical, counters will be able to fit until the FIFO fills up to their level, and then counters at that higher value are subject to the same odds of being flushed.

In one embodiment, there is no requirement for the off-chip counters to maintain the full counter width, and the least-significant portion of the counter can stay on-chip. In other words, when updating an overflowing counter, only the "carry out" needs to get added in to the off-chip counter. In one embodiment, packet and byte counters are handled in parallel, while in one embodiment, packet and byte counters are handled sequentially or individually. In one embodiment, both memories (i.e., that referred to as the on-chip memory and the off-chip memory) are located on a single chip, while this same update mechanism is used with the two on-chip memories.

One embodiment is used in conjunction with a packet processing chip that is designed for a 50M PPS arrival rate, and maintains packet and byte count statistics in three categories, the largest of which holds 1M items. The on-chip RAM maintains 5-bit packet counters and 12-bit byte counters. The largest category (containing 1M items) thus requires 17 Mb of storage. The overflow FIFO for the 1M item category is only 2K entries deep. The off-chip packet and byte counters for all three categories are maintained in a 64-bit wide RLDRAM running at 200 MHz DDR (25.6 Gbps peak bandwidth). The packet and byte counters are stored as 57 bits each in a 128-bit memory word in RLDRAM, using seven additional bits for each of the packet and byte counters for ECC. The off-chip storage is approximately seven times the size of the on-chip storage.

With a packet arrival rate of 50M PPS, the counter update bandwidth required if all packets had to reference off-chip memory (updating counters in three categories) is approximately 38.4 Gbps, exceeding even the peak RLDRAM bandwidth. One embodiment uses a counter update rate, after accounting for CPU and refresh overhead, that averages approximately 6.9M counter updates per second for each category, which yields a bandwidth difference of a factor of approximately 7 as compared to the arrival rate. Even though packets can arrive at 50M PPS (generating counter updates at that rate for up to 1M different items) and can only be flushed to off-chip memory at approximately 7M PPS, one embodiment is able to handle this load without resorting to backpressure.

In one embodiment, the packet counters were used as-is, and the five MSBs of the byte counters were used to provide a similar granularity for determining whether to flush the larger on-chip byte counters. If either the packet or the byte counter would fit in the FIFO, they were both flushed as a pair. (The off-chip memory interface always dealt with packet/byte counter pairs, not with individual counters.) With the sizes of overflow FIFOs used in one embodiment, a value of 2 for n worked well. With a 2K entry overflow FIFO and 5-bit on-chip counters, this would mean that 63 entries (0 to 62) in the FIFO can be used for non-overflowed counters, and the vast majority of the FIFO is reserved for the overflow case. Of course, embodiments of the invention can use any static value of n, or can vary n, such as in response to traffic, loading, or other conditions or stimuli, or can use other functions for relating the counter value and FIFO depth in the determination of whether or not to flush.

For example, with a drain rate that is 1/7 of the arrival rate with 5-bit on-chip counters, the odds of one counter overflowing are roughly $(6/7)^{31}=0.8\%$. But in order to create back-pressure, the overflow FIFO must be filled with overflowed counters, and the odds of this (almost 2K counters overflowing at once) happening randomly are negligible.

Even the worst-case bandwidth degradation of this scheme can be shown to be very small due to the number of counter increments necessary to create an overflow. For example, using the same parameters as above, if 1M different counters are referenced, only 6/7 of them will end up incremented—the other 1/7 will be flushed. If the 6/7 of the 1M counters that were incremented could even be determined externally and only these counters were referenced, a similar reduction would occur and there would be 36/49 of the original 1M counters that were incremented twice. But note that it has taken 13/7 M references so far. By the time we can increment some number of counters to overflow, the number of required references (given all the flushes that occur during this process) is so large that the bandwidth degradation even in this worst-case pathology is typically very small.

Figure 1A:
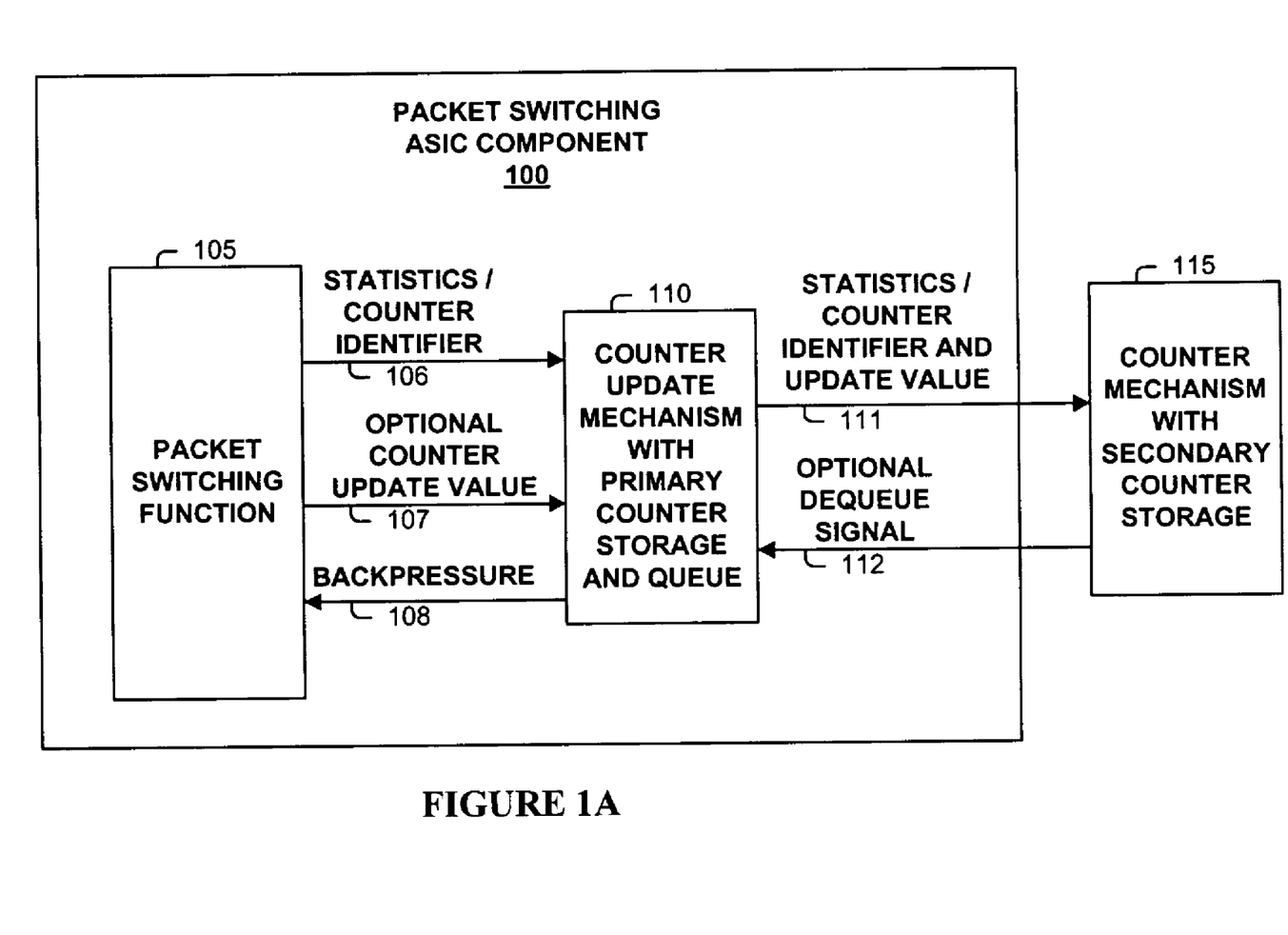
FIG. 1A is a block diagram of an ASIC including the primary counter storage and an external secondary counter storage.

Turning to FIG. 1A, illustrated is an exemplary packet switching ASIC component 100 including a counter update mechanism and primary counter storage and queue 110. Note, embodiments of the invention can be used in an unlimited number of contexts and applications, and the discussion of packet switching is just to illustrate one such application.

As shown, packet switching function 105 generates a statistics/counter identifier 106 and optionally a counter update value 107. In one embodiment, statistics/counter identifier 106 is an address in a primary storage (e.g., memory or other storage mechanism). In one embodiment, statistics/counter identifier 106 is used to determine an address in a primary storage corresponding to the particular counter to be updated. Counter update value is optionally generated, as in some contexts, the value to update the counter may be inferred from the particular counter being updated or it might always the be the same, such as always update the counter by one.

Counter update mechanism with primary counter storage and queue 110 updates its representation of the particular counter in its primary counter storage or places the updated value in a queue for updating the corresponding value stored in counter mechanism with secondary counter storage 115, which receives statistics/counter identifier and update value 111. In one embodiment, a dequeue signal 112 is generated by counter mechanism with secondary storage 115 to request a next statistics/counter identifier and update value 111. If the queue is full and an item is determined to be added to it, counter update mechanism with primary counter storage and queue 110 generates a backpressure signal 108 to typically delay receiving any further counter update requests.

Figure 1B:
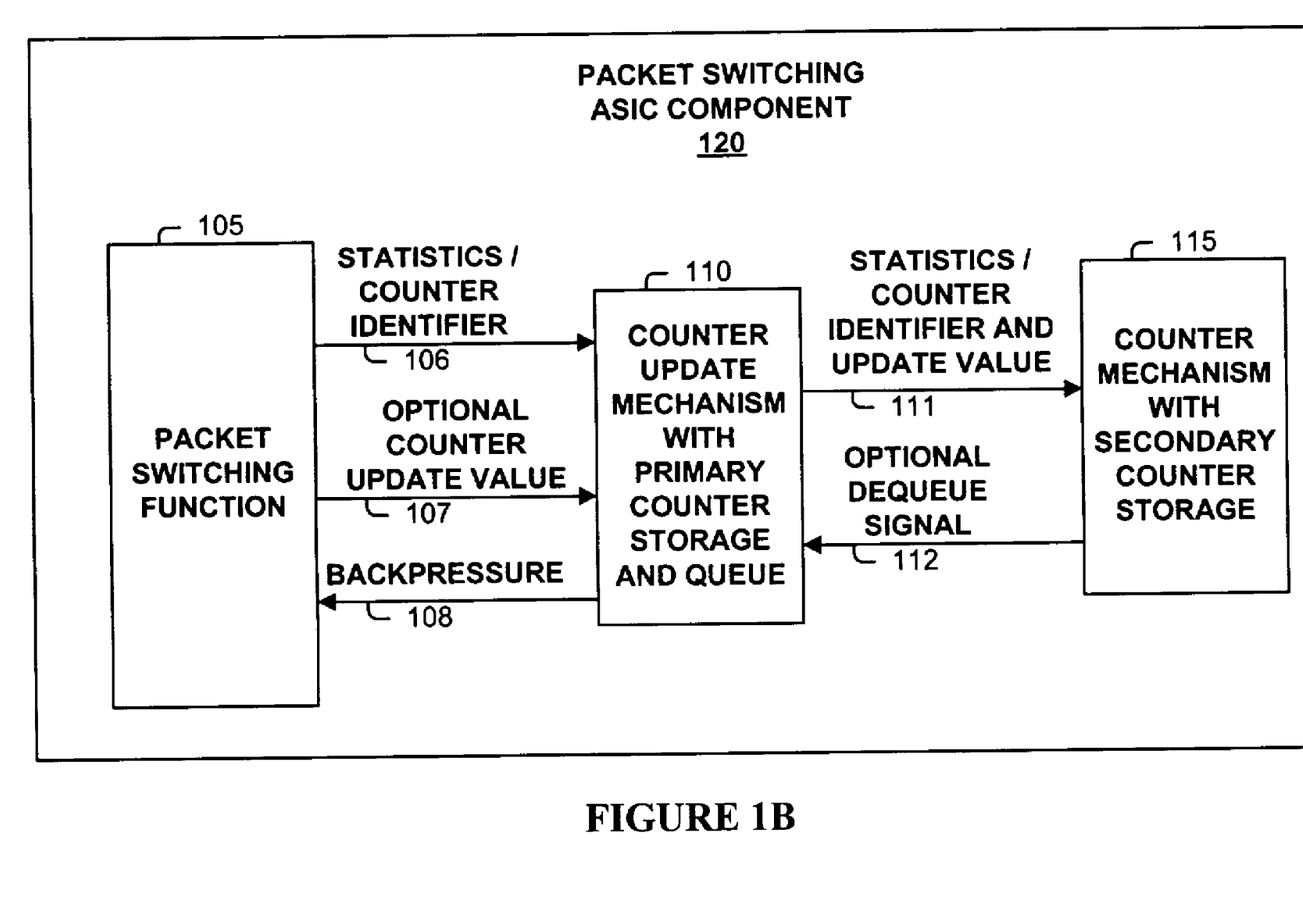
FIG. 1B is a block diagram of an ASIC including both the primary and secondary counter storage.

FIG. 1B illustrates that in one embodiment exemplary packet switching ASIC component 120 may include both counter update mechanism and primary counter storage and queue 110 and counter mechanism with secondary counter storage 115.

Figure 1C:
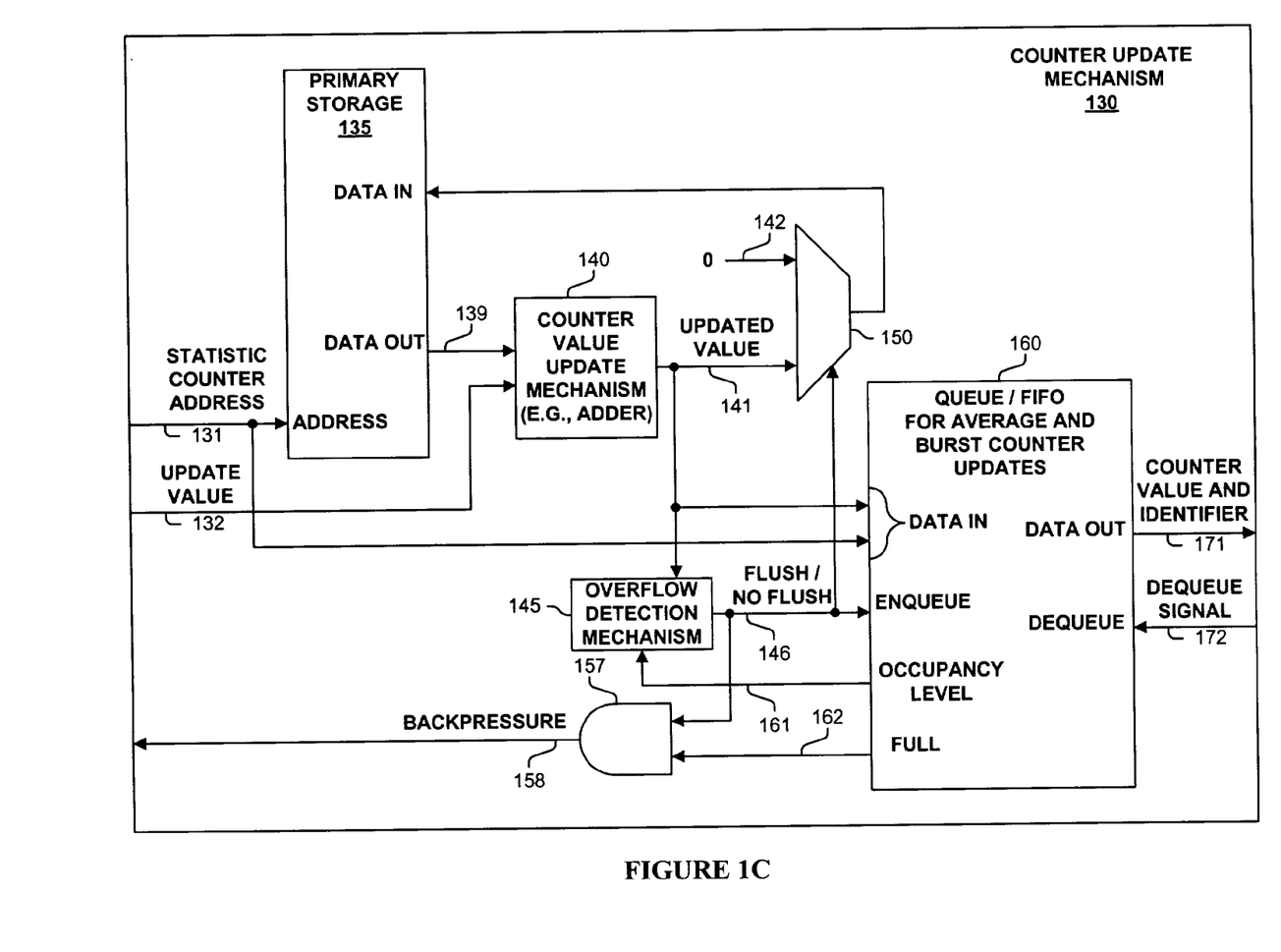
FIG. 1C is a block diagram of a counter update mechanism used in one embodiment.

FIG. 1C illustrates a counter update mechanism 130, which in one embodiment, corresponds to counter update mechanism with primary counter storage and queue 110 (FIGS. 1A and 1B). As shown, the statistics counter address 131 and update value 132 are received. Update value 132 could also be a predetermined value, generated based on statistics counter identifier address 131, or generated by any other mechanism.

The current value 139 of for the particular counter being updated is retrieved from primary storage 135 based on the received statistics counter address 131. Counter value update mechanism 140 determines updated value 141, such as by adding current value 139 with update value 132. Overflow detection mechanism 145 then determines, typically based on updated value 141 and an indication of an occupancy level 161 of queue 160, and signals this result as flush/no flush signal 146. In one embodiment, this determination includes comparing a function of updated value 141 with occupancy level 161. In one embodiment, this determination includes comparing twice updated value 141 with occupancy level 161. Queue 160 typically is sized to store items received at the average arrival rate, as well as bursts of counter updated values 141.

If the particular counter is not to be flushed, the selector or multiplexor 150, based on flush/no flush signal 146, selects updated value 141 to be used to update the value of the particular counter in primary storage 135.

Otherwise, selector or multiplexor 150 selects value signal 142 (e.g., zero), and the particular counter is reset in primary storage 135; and statistic counter address 131 and updated value 141 are added to queue 160.

Additionally, in one embodiment, backpressure signal 158 is generated by backpressure signal generator 157 (e.g., an AND operation in one embodiment) typically based on queue full indication 162 and flush/no flush signal 146. Typically, backpressure signal 158 indicates the packet processor needs to be stalled when queue 160 is full and an item is to be added to it.

Items stored in queue 160 are then retrieved optionally based on dequeue signal 172 to generate counter value and identifier signal 171.

Figure 1D:
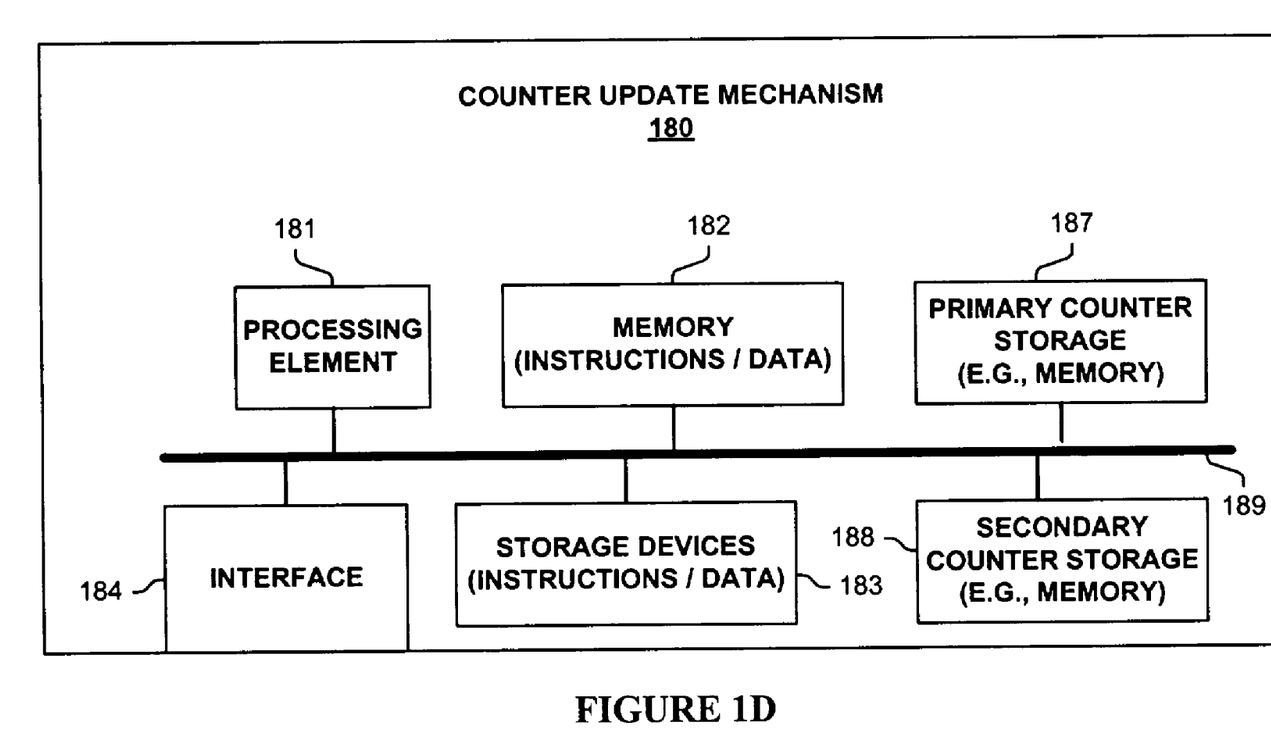
FIG. 1D is a block diagram of a counter update mechanism used in one embodiment.

FIG. 1D is a block diagram of one embodiment of a counter update mechanism 180 including primary counter storage 187 and secondary counter storage 188. In one embodiment, communications mechanism counter update mechanism 180 includes a processing element 181, memory 182, storage devices 183, primary counter storage 187, secondary counter storage 188, and interface 184 for receiving counter update requests and for communicating stored counter values with other entities, which are typically coupled via one or more communications mechanisms 189 (shown as a bus for illustrative purposes). Various embodiments of counter update mechanism 180 may include more or less elements. The operation of counter update mechanism 180 is typically controlled by processing element 181 using memory 182 and storage devices 183 to perform one or more tasks or processes. Memory 182 is one type of computer-readable medium, and typically comprises random access memory (RAM), read only memory (ROM), flash memory, integrated circuits, and/or other memory components. Memory 182 typically stores computer-executable instructions to be executed by processing element 181 and/or data which is manipulated by processing element 181 for implementing functionality in accordance with the invention. Storage devices 183 are another type of computer-readable medium, and typically comprise solid state storage media, disk drives, diskettes, networked services, tape drives, and other storage devices. Storage devices 183 typically store computer-executable instructions to be executed by processing element 181 and/or data which is manipulated by processing element 181 for implementing functionality in accordance with the invention.

Figure 2:
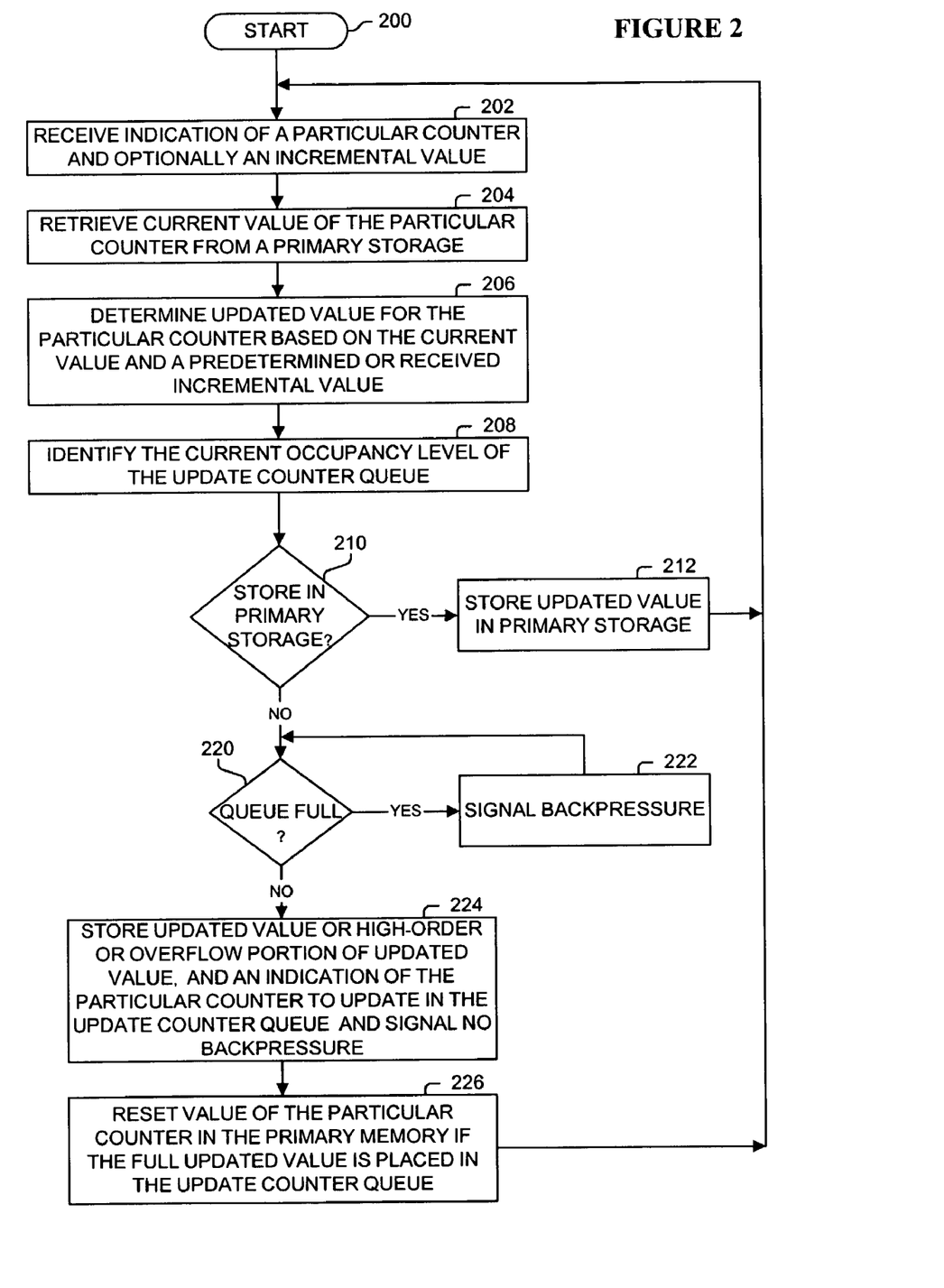
FIGS. 2-3 are flow diagrams illustrating processes used in one embodiment for maintaining statistics counters.

FIG. 2 illustrates a process of a counter update mechanism used in one embodiment. Processing begins with process block 200, and proceeds to process block 202, wherein an indication of a particular counter to update and optionally an incremental value are received. Next, in process block 204, the current value of the particular counter is retrieved from the primary storage. In process block 206, the updated value for the particular counter is determined based on the retrieved current value and a predetermined or received incremental value. In process block 208, the current occupancy level of the update counter queue is identified.

In process block 210, a determination is made whether to store the updated value in the primary storage or to add to an update counter queue based on the updated value and an occupancy level of the update counter queue. In one embodiment, this determination includes comparing a function of the updated value with the occupancy level. In one embodiment, this determination includes comparing a function of the current value with the occupancy level. As previously described, different functions can and are used in different embodiments, and any function can be used. As a simple example, in one embodiment, this determination includes comparing twice the updated value with the occupancy level.

As determined in process block 210, if the representation of the particular counter is to be updated in the primary storage with the updated value, then in process block 212, the updated value is stored at the location in the primary storage corresponding to the particular counter. Otherwise, while the update counter queue is full as determined in process block 220, backpressure is signaled in process block 222. Then (or immediately if the update counter queue was not full), in process block 224, the updated value or a high-order or overflow portion of the updated value, and an indication of the particular counter is stored in the update counter queue and no backpressure is signaled. In process block 226, the value of the particular counter in primary storage is updated to reflect the value transferred to the secondary storage. For example, in one embodiment in which the entire updated counter value is placed in the update counter queue, the representation of the particular counter is reset (e.g., a value of zero is stored). In one embodiment, a high-order portion or overflow portion is masked, subtracted, or dropped from the updated value or possibly the implementation automatically generates the updated counter value to be stored in primary storage (e.g., memory or other storage mechanism). Processing then returns to process block 202.

Figure 3:
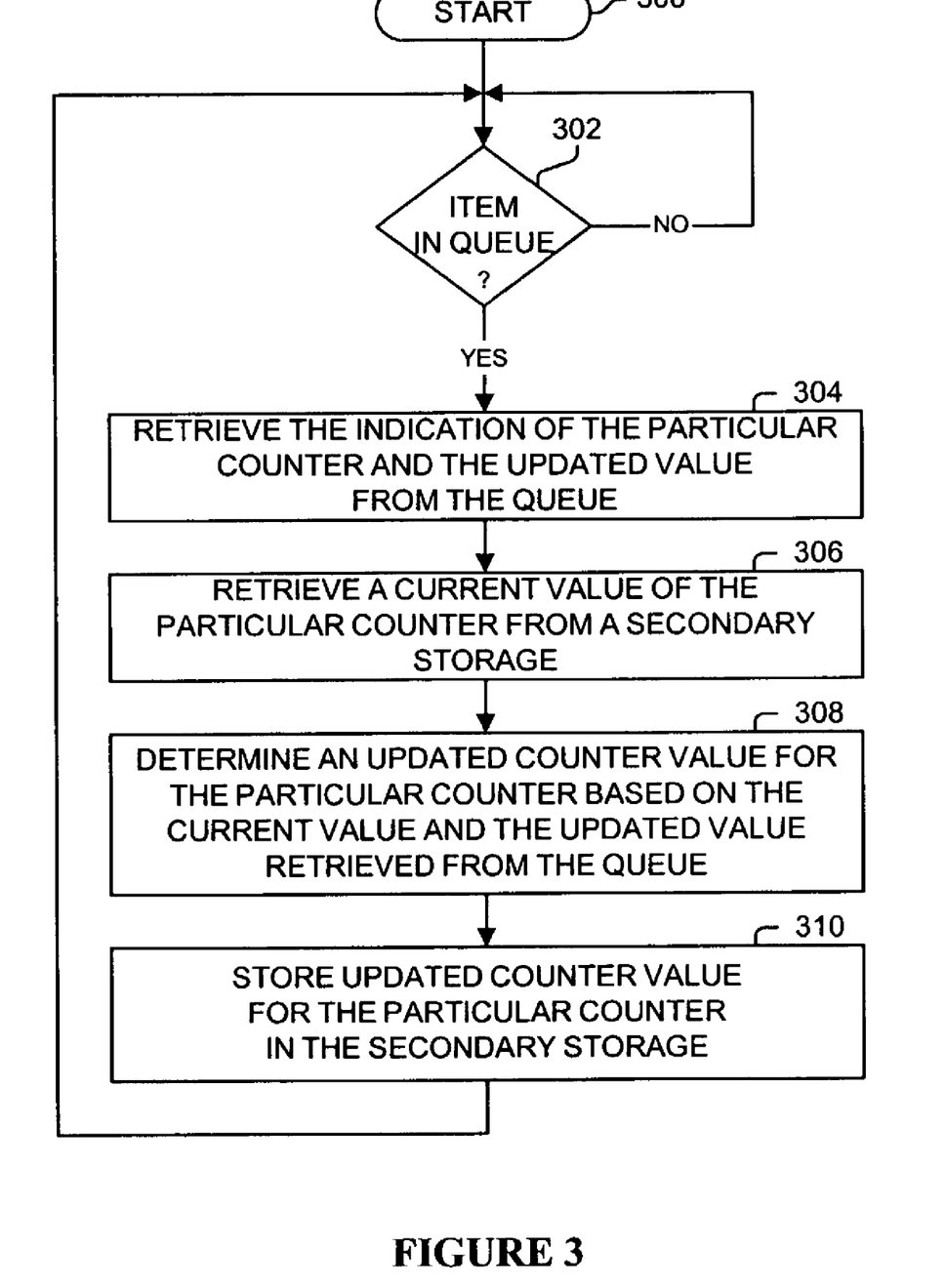

FIG. 3 illustrates a process used in one embodiment for retrieving items from the update counter queue and updating secondary storage. Processing begins with process block 300, and proceeds to process block 302. When there is an item in the update counter queue, processing proceeds to process block 304, wherein an indication of the particular counter and the updated value are retrieved from the update counter queue. Next, in process block 306, a current value of the particular counter is retrieved from secondary storage. In process block 308, this current value and updated value are added together, with this result, in process block 310, being stored in the location in secondary storage corresponding to the particular counter. Processing returns to process block 302.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for maintaining counters, the method comprising:
   storing a plurality of counter values in a primary counter storage;
   receiving an indication of a particular counter of the plurality of counters to update;
   identifying a current value of the particular counter;
   determining an updated value for the particular counter based on the current value; and
   in response to determining whether to store the updated value in the primary counter storage or to add to an update counter queue based on the updated or the current value and an occupancy level of the update counter queue: (a) storing the updated value in the primary counter storage or (b) adding a queued value representing the updated value to the update counter queue and subsequent updating a counter value corresponding to the particular counter in a secondary storage based on the queued value.

2. The method of claim 1, wherein said determining whether operation determined to add to the update counter queue; and wherein said operation of adding the queued value representing the updated value to the update counter queue and subsequent updating the counter value corresponding to the particular counter in the secondary storage based on the queued value includes:
   storing the updated value in the update counter queue;
   resetting the particular counter in the primary counter storage;
   retrieving the updated value from the update counter queue; and
   updating the counter value corresponding to the particular counter in the secondary storage.

3. The method of claim 2, comprising generating a backpressure signal based on the occupancy level and the result of said determining whether to store the updated value in the primary counter storage or to add to the update counter queue.

4. The method of claim 1, wherein said determining whether includes comparing a function of the updated value with the occupancy level.

5. The method of claim 4, wherein said determining whether includes comparing twice the updated value with the occupancy level.

6. The method of claim 1, comprising generating a backpressure signal based on the occupancy level and the result of said determining whether to store the updated value in the primary counter storage or to add to the update counter queue.

7. The method of claim 1, wherein said determining whether operation determined to add to the update counter queue; and wherein said operation of adding the queued value representing the updated value to the update counter queue and subsequent updating the counter value corresponding to the particular counter in the secondary storage based on the queued value includes:
   storing a high-order portion or overflow value of the updated value in the update counter queue;
   retrieving the high-order portion or overflow value of the updated value from the update counter queue; and
   updating the counter value corresponding to the particular counter in the secondary storage.

8. An apparatus for maintaining counters, the apparatus comprising:
   a primary counter storage;
   an update counter queue;
   a counter value update mechanism coupled to the primary counter storage and the update counter queue;
   a secondary counter storage coupled to the update counter queue; and
   an overflow detection mechanism coupled to the update counter queue;
   wherein the apparatus is configured to store a counter value produced by the counter value update mechanism in the primary counter storage or in the update counter queue in response to a determination made by the overflow detection mechanism based on the counter value and an occupancy level of the update counter queue; and wherein the secondary storage is configured to be updated based on values retrieved from the update counter queue.

9. The apparatus of claim 8, wherein said determination by the overflow detection mechanism includes comparing a function of the counter value with the occupancy level.

10. The apparatus of claim 9, wherein said determination by the overflow detection mechanism includes comparing twice the counter value with the occupancy level.

11. The apparatus of claim 8, comprising a backpressure signal generation mechanism coupled to the overflow detection mechanism and the update counter queue configured to generate a backpressure signal based on values generated by the overflow detection mechanism and the update counter queue.

12. An apparatus for maintaining counters, the apparatus comprising:
means for storing a plurality of counter values in a primary counter storage;
means for receiving an indication of a particular counter of the plurality of counters to update;
means for determining an updated value for the particular counter;
means for in response to determining whether to store the updated value in the primary counter storage or to add to an update counter queue based on the updated value and an occupancy level of the update counter queue: (a) storing the updated value in the primary counter storage or (b) adding a queued value representing the updated value to the update counter queue and subsequent updating a counter value corresponding to the particular counter in a secondary storage based on the queued value.

13. The apparatus of claim 12, wherein said operation of adding the queued value representing the updated value to the update counter queue and subsequent updating the counter value corresponding to the particular counter in the secondary storage based on the queued value includes:
means for storing the updated value in the update counter queue;
means for resetting the particular counter in the primary counter storage;
means for retrieving the updated value from the update counter queue; and
means for updating the counter value corresponding to the particular counter in a secondary storage.

14. The apparatus of claim 12, wherein said means for determining whether includes means for comparing a function of the updated value with the occupancy level.

15. The apparatus of claim 14, wherein said means for determining whether includes means for comparing twice the updated value with the occupancy level.

16. The apparatus of claim 12, comprising means for generating a backpressure signal based on the occupancy level and the result of said determining whether to store the updated value in the primary counter storage or to add to the update counter queue.

17. A computer-readable medium tangibly storing thereon computer-executable instructions for performing steps when executed by a processing element for maintaining counters, said steps comprising:
storing a plurality of counter values in a primary counter storage;
receiving an indication of a particular counter of the plurality of counters to update;
determining an updated value for the particular counter;
in response to determining whether to store the updated value in the primary counter storage or to add to an update counter queue based on the updated value and an occupancy level of the update counter queue: (a) storing the updated value in the primary counter storable or (b) adding a queued value representing the updated value to the update counter queue and subsequent updating a counter value corresponding to the particular counter in a secondary storage based on the queued value.

18. The computer-readable medium of claim 17, wherein said operation of adding the queued value representing the updated value to the update counter queue and subsequent updating the counter value corresponding to the particular counter in the secondary storage based on the queued value includes the steps of:
storing the updated value in the update counter queue;
resetting the particular counter in the primary counter storage;
retrieving the updated value from the update counter queue; and
updating the counter value corresponding to the particular counter in the secondary storage.

19. The computer-readable medium of claim 17, wherein said determining whether includes comparing a function of the updated value with the occupancy level.

20. The computer-readable medium of claim 19, wherein said determining whether includes comparing twice the updated value with the occupancy level.

21. The computer-readable medium of claim 17, wherein said steps include: generating a backpressure signal based on the occupancy level and the result of said determining whether to store the updated value in the primary counter storage or to add to an update counter queue.

22. The computer-readable medium of claim 17, wherein said operation of adding the queued value representing the updated value to the update counter queue and subsequent updating a counter value corresponding to the particular counter in a secondary storage based on the queued value includes the steps of:
storing a high-order portion or overflow value of the updated value in the update counter queue;
retrieving the high-order portion or overflow value of the updated value from the update counter queue; and
updating the counter value corresponding to the particular counter in the secondary storage.

23. An apparatus for maintaining counters, the apparatus comprising:
means for storing a plurality of counter values in a primary counter storage;
means for receiving an indication of a particular counter of the plurality of counters to update;
means for determining an updated value for the particular counter;
means for determining whether to store the updated value in the primary counter storage or to add to an update counter queue based on the updated value and an occupancy level of the update counter queue; and
means for generating a backpressure signal based on the occupancy level and the result of said determining whether to store the updated value in the primary counter storage or to add to an update counter queue.

* * * * *

UNITED STATES PATENT AND TRADEMARK OFFICE
CERTIFICATE OF CORRECTION

PATENT NO. : 7,304,942 B1  Page 1 of 1
APPLICATION NO. : 10/295181
DATED : December 4, 2009
INVENTOR(S) : Malladi et al.

It is certified that error appears in the above-identified patent and that said Letters Patent is hereby corrected as shown below:

Col. 2, line 24, replace "(RMW) open" with -- (RMW) operation --

Col. 2, line 27, replace "RMW open" with -- RMW operation --

Col. 3, line 59, replace "configuns" with -- configurations --

Col. 3, line 61, replace "configuns" with -- configurations --

Col. 5, line 19, replace "opens" with -- operations --

Col. 5, line 56, replace "open" with -- operation --

Col. 6, line 21, replace "nal" with -- rational --

Col. 14, line 6-7, replace "storable" with -- storage --

Signed and Sealed this

Fifth Day of January, 2010

David J. Kappos
*Director of the United States Patent and Trademark Office*